May 26, 1970   J. R. PENNINGTON   3,513,919
POWER TRANSFER UNIT FOR CONVERTING RECIPROCATING
MOTION TO ROTARY MOTION
Filed April 22, 1969   2 Sheets-Sheet 1

INVENTOR.
JAMES R. PENNINGTON
BY
ATTORNEY

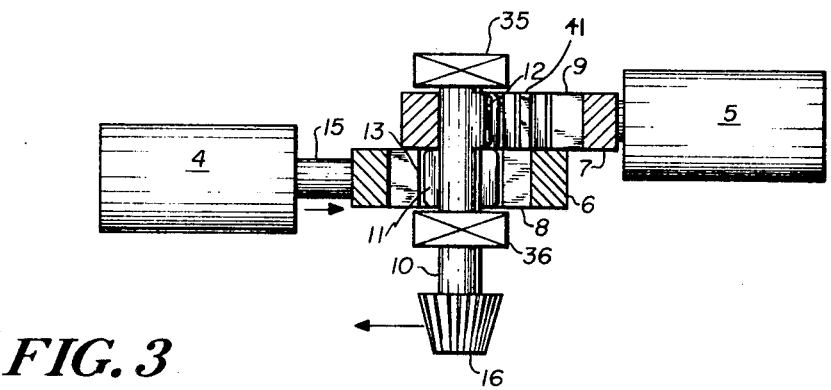
FIG. 3
FIG. 4
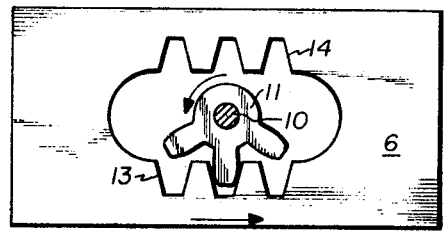
FIG. 5
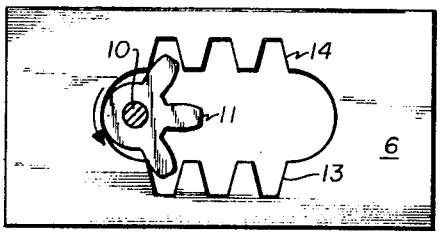
FIG. 6
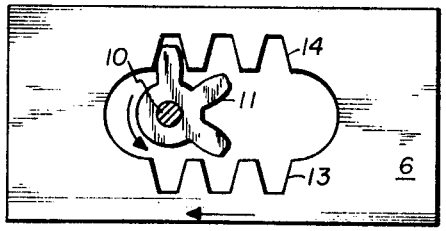
FIG. 7
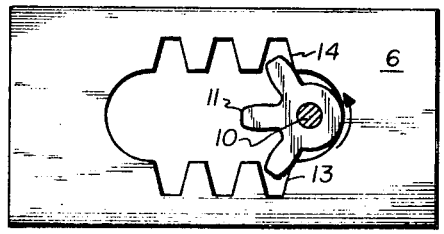
INVENTOR.
JAMES R. PENNINGTON United States Patent Office 3,513,919
Patented May 26, 1970

3,513,919
POWER TRANSFER UNIT FOR CONVERTING RECIPROCATING MOTION TO ROTARY MOTION
James R. Pennington, Basking Ridge, N.J., assignor to Allied Chemical Corporation, New York, N.Y., a corporation of New York
Continuation-in-part of application Ser. No. 728,027, May 9, 1968. This application Apr. 22, 1969, Ser. No. 826,761
Int. Cl. E21d 1/06
U.S. Cl. 175—53                    7 Claims

ABSTRACT OF THE DISCLOSURE

This application relates to a power transfer unit for transferring reciprocating motion to continuous rotary motion. The unit comprises a plurality of reciprocating drive means, such as two or more cylinders, the pistons or cylinders of which are operably connected to a corresponding slidable plate. Each plate has an elongated opening therein having a rack of gear teeth on opposite sides of the opening, such as at the top and bottom thereof. Extending through the opening of each plate is an output shaft having a plurality of partial pinion gears, one for each plate, mounted thereon so as to drive the shaft. The pinions are mounted out of phase, preferably about 90°, of each other. As the pistons or the cylinders move back and forth the racks on the sliding plates actuate the pinions in such a manner as to impart to the shaft constant speed rotary motion.

This application also relates to the combination of such a power transfer unit with a boring machine.

This application is a continuation-in-part of U.S. application Ser. No. 728,027, filed May 9, 1968, now abandoned by the same inventor.

BACKGROUND OF THE INVENTION

Field of the invention

This invention pertains to the field of compact power transfer units for converting reciprocating motion to continuous rotary motion.

This invention also pertains to the field of compact power transfer units for generating high torque at low speeds.

In many applications it is desirable to use a power transfer unit which will produce high torque at low speeds and will convert reciprocating motion into continuous rotary motion. An example of an application for such a power transfer unit is in mining machinery used in boring operations. Obviously when the power generating and power transfer units are to be used inside a hole remote from the operator compactness is a very desirable feature. Furthermore, high torque at low speeds is obviously very desirable for boring rock and other materials.

In the past many types of power transer units to achieve high torque at low speeds have been developed. An example of this is the commonly used simple crank mechanism such as was used to power the wheels of steam locomotives. Such a crank mechanism does not have the feature of compactness required for many applications such as down-hole boring operations. Other types of power generating equipment have also been used to generate high torque at low speeds, for example electric motors. Here again, however, a motor of the power necessary to produce high torque at low speeds does not possess the requisite compactness for downhole boring operations.

According to the present invention there is provided a power transfer unit for converting reciprocating motion to continuous rotary motion comprising a plurality of reciprocating drive means, sliding means operably connected to the drive means, each sliding means having an opening therein, power output means extending through the openings on the slides, and first power transfer means mounted on the sliding means for intermittent connection with second power transfer means mounted on the output means, the intermittent connection being such that continuous rotary motion is imparted to the output means upon the reciprocation of the drive means.

In a preferred embodiment the power transfer unit comprises two or more opposed double acting cylinders. The piston of each cylinder is operably connected to a corresponding slidable plate. Each slidable plate comprises an elongated opening therein having smooth rounded ends and a rack of gear teeth at the top and bottom thereof. Extending through the openings in the sliding plates is an output shaft having one partial pinion gear thereon meshing with each sliding plate. The partial pinions are mounted out of phase with each other, for example by 90°. While each partial pinion is in engagement with either the upper or lower rack of its corresponding sliding plate it is driven thereby. When the partial pinion has been rotated so that its teeth are no longer in engagement with one of the racks of the sliding plate, for example the lower rack, it is swung to engage the other rack, for example the upper rack, by the action of the other partial pinion or pinions on the same shaft which are out of phase with this partial pinion. In this manner continuous rotary motion is imparted to the shaft.

Briefly, in an example of operation using a single pair of pistons, as one piston slides its corresponding sliding plate to the right it rotates counterclockwise the first partial pinion which is engaging the bottom rack of that plate. Simultaneously, the second partial pinion, which is 90° out of phase therewith and connected to the piston of the other opposed double-acting cylinder, is at the end of its plate and rotating to the upper rack of the plate. In this manner continuous rotary motion is achieved from reciprocating motion.

The operation of this invention will be made clearer upon reading the following drawings and accompanying description.

FIG. 3 is a view taken along line 3—3 of FIG. 1 showing a top view of the partial pinions engaged with the sliding racks.

FIGS. 4 through 7 show progressive views of a sliding plate and its corresponding partial pinion as they pass through a complete cycle of operation.

Figure 1:
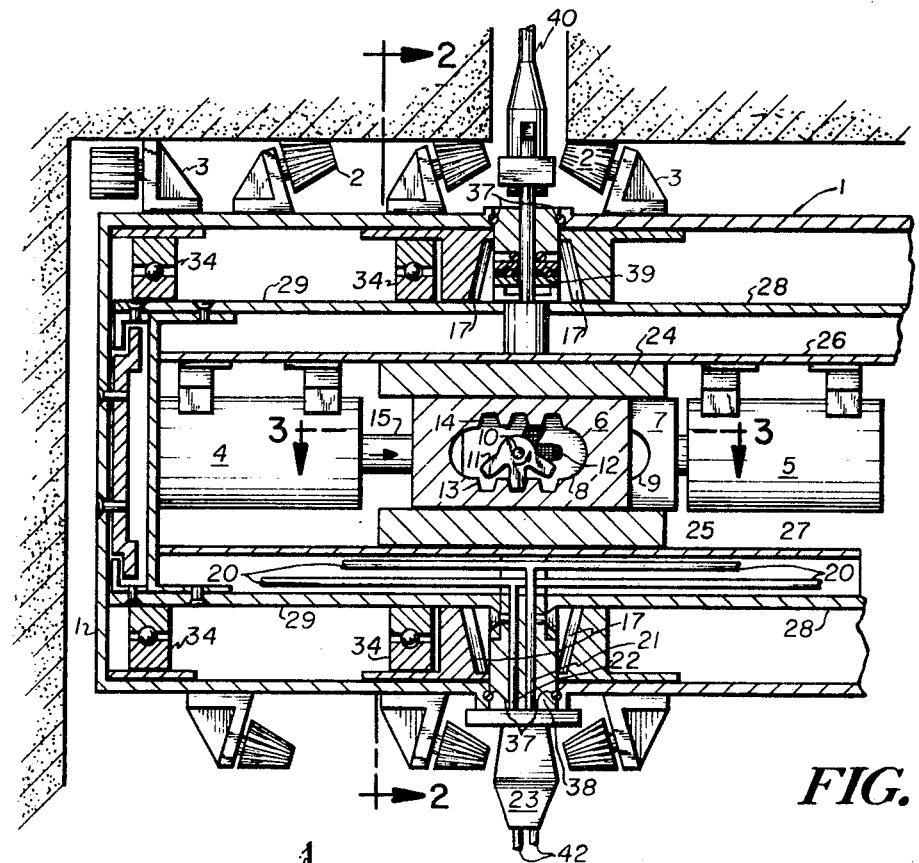
FIG. 1 is a partial cross-sectional view of a boring machine.

Referring more particularly to the drawings, FIG. 1 is a cross-sectional view of a boring machine which incorporates the power transfer unit of this invention, comprising two outer shells 1 having roller cutters 2 mounted on brackets 3 thereon. Outer shells 1 are rotatable on bearings 34 about stationary inner shells 28 and 29, and are driven with respect thereto in a manner which will be described later. The inner end of each outer shell 1 abuts stationary center plate 38 and rotates with respect thereto. O-rings 37 form a seal between the abutting faces of the center plate 38 and outer shells 1. Inside inner shells 28 and 29 are mounted two double-acting cylinders, shown schematically at 4 and 5, in opposing relationship. The pistons of each of these cylinders are connected respectively to sliding plates 6 and 7. Sliding plates 6 and 7 have openings 8 and 9 respectively therein. Extending through openings 8 and 9 is an output shaft 10, mounted for rotation on bearings 35 and 36 (see FIGS. 2 and 3), which is driven by two partial pinion gears 11 and 12. Gears 11 and 12 are mounted on shaft 10, gear 12 being mounted behind gear 11 and 90° out of phase therewith. At the top and bottom of openings 8 and 9 are racks of gear teeth, for example 13 and 14 on plate 6. As the piston in cylinder 4 moves to the right it pushes connecting link 15 to the right and thus pushes plate 6, which is fixedly attached thereto, to the right. As plate 6 moves to the right, partial pinion gear 11 is turned counterclockwise. At the same time plate 7 which is behind plate 6 is reaching the maximum point of its travel to the right, being driven by the piston in cylinder 5. At this time partial pinion gear 12 swings from the bottom gear rack to the top gear rack of plate 7. In this manner continuous rotary motion of shaft 10 is achieved from the reciprocating motion of the pistons in cylinders 4 and 5, and high torque at low speeds is produced.

Output shaft 10 drives gear 16 (see FIG. 2), which in turn drives ring gears 17 in opposite directions. Ring gears 17 are attached to outer shells 1 and drives them in opposite directions, outer shells 1 and ring gears 17 rotating on bears 34 about inner shells 28 and 29. For purposes of simplicity and clarity the bearings have not been shown above and below inner shell 28 since they are the same as those shown round inner shell 29.

Hydraulic fluid, steam, compressed gas, hot gases, fluorocarbon vapors may be used to actuate cylinders 4 and 5. These may be supplied in a conventional manner to the cylinders through conduits 20, 21, and 22. Conventional highly synchronized cam-controlled valve means (now shown) are used to actuate the piston in each double-acting cylinder so as to achieve synchronization of the sliding plates with respect to each other.

Figure 2:
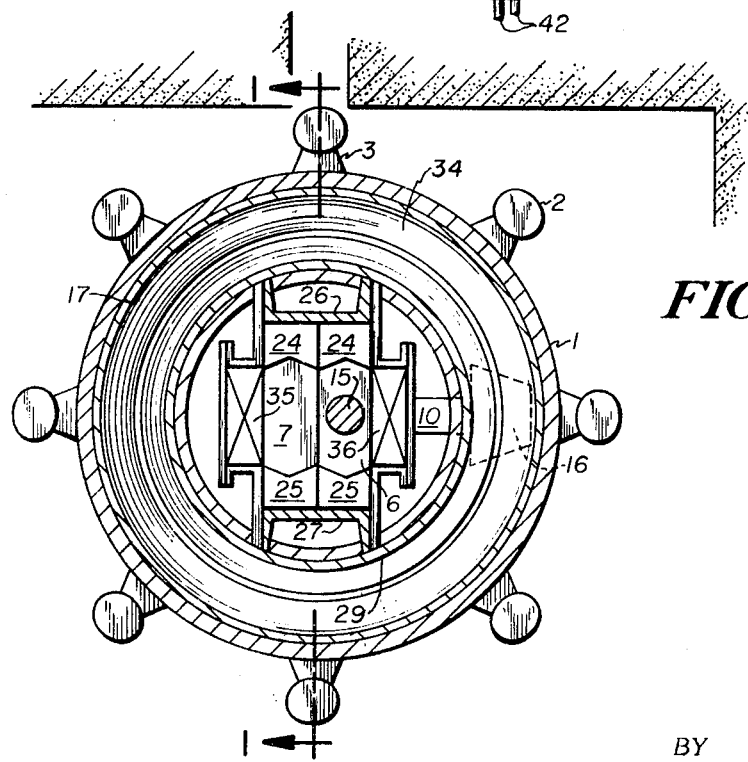
FIG. 2 is a cross-sectional view taken along the lines 2—2 of FIG. 1.

Referring more particularly to FIG. 2, this figure shows output shaft 10 operably connected to gear 16 which drives ring gear 17 (see FIG. 1) and thus turns outer shell 1 on bearings 34 (see FIG. 1). Members 26 and 27 are the top and bottom supports for cylinders 4 and 5. Members 24 and 25, mounted on support members 26 and 27, are guides for plates 6 and 7.

FIG. 3 is a somewhat schematic view of the power transfer mechanism of FIG. 1, the central portion of the figure being a cross-section taken at line 3—3 on FIG. 1. Cylinders 4 and 5, which are schematically shown, are connected to sliding plates 6 and 7 respectively. Bottom gear racks 13 and 41 of plates 6 and 7 drive partial gears 11 and 12 which are positioned 90° out of phase of each other. In this manner output shaft 10 is caused to rotate counterclockwise, being supported by bearings 35 and 36.

The boring machine described in the above paragraphs is suspended from a cable 40 and can turn about thrust bearing 39. Hydraulic fluid to power cylinders 4 and 5 is fed in through supply lines 42 leading into swivel 23. Lines 42 connect with passages 21 and 22. The operation of the boring machine described is described in U.S. application Ser. No. 700,319, filed Jan. 2, 1968 by the same inventor. The disclosure of that application is incorporated herein by reference.

FIGS. 4, 5, 6 and 7 illustrate the relative movement of a sliding plate with respect to its corresponding partial pinion gear as the plate makes one complete back and forth cycle. Reference numeral 6 indicates the sliding plate of FIG. 4 which is moving to the right as indicated by the arrow. The engagement between pinion 11 and lower rack 13 during this motion causes pinion 11 and its attached shaft to rotate counterclockwise as indicated by the arrow.

As shown in FIG. 5, as plate 6 reaches the extremity of its motion to the right, partial pinion 11 ceases to engage the bottom rack 13 and is swung from the bottom rack toward the top rack 14. This swinging motion is caused by the other partial pinion gear (not shown) on the shaft 10 which is 90° out of phase with gear 11. Thus the other partial pinion gear is engaged and is driving partial pinion gear 11 from the bottom rack toward the top rack.

As shown in FIG. 6, as the plate 6 moves back to the left as indicated by the arrow, the partial pinion gear 11 engages upper gear rack 14 and is turned counterclockwise thereby.

FIG. 7 shows sliding plate 6 as it reaches the extremity of its motion to the left. Partial pinion gear 11 is shown swinging from upper gear rack 14 to lower gear rack 13. The cycle then begins again as shown in FIG. 4.

Although FIGS. 4–7 illustrate the cycle which one sliding plate and its corresponding partial pinion gear pass through, it should be remembered that there is at least one other plate and corresponding gear operating out of phase, for example 90°, with the plate and gear of FIGS. 4–7. In this manner continuous rotary motion is imparted to output shaft 10, since when one partial pinion gear is swinging between racks the other is engaged and being driven.

Although this application has been described with respect to use of a pair of cylinders, it will be obvious to those skilled in the art that any number of cylinders greater than two can be used as long as they are arranged out of phase with each other. Also other reciprocating drive means such as linear electric motors, solenoids and the like may be used.

Although this invention has been described with particular reference to its use in a boring machine, it will be obvious to those skilled in the art that it can be utilized in numerous other places where high torque at low speeds is desired upon transferring reciprocating motion to continuous rotary motion.

I claim:
1. A power transfer unit for transferring reciprocating motion to continuous rotary motion comprising:
    (A) a plurality of reciprocating drive means,
    (B) sliding means operably connected to the drive means, each sliding means having opening means therein,
    (C) power output means extending through the opening means in said sliding means,
    (D) first power transfer means mounted on said sliding means for intermittent connection with second power transfer means mounted on said output means, the intermittent connection being such that continuous rotary motion is imparted to said output means.

2. The power transfer unit of claim 1 wherein the sliding means are plates, the output means is a shaft and the power transfer means on the sliding plates and on the output shaft are gear teeth.

3. The power transfer unit of claim 2 wherein the gear teeth on the sliding plates are in form of two opposed racks positioned on opposite sides of the opening means and the gear teeth on the output shaft are in the form of partial pinion gears cooperable with the rack teeth.

4. The power transfer unit of claim 3 wherein the partial pinions are mounted on the output shaft so as to operate out of phase with each other.

5. The power transfer unit of claim 4 wherein there are two sliding plates and two partial pinions mounted to operate 90° out of phase with each other.

6. The power transfer unit of claim 1 wherein said power transfer unit is operatively connected to power a boring machine and is housed inside said boring machine.

7. The power transfer unit of claim 1 wherein the reciprocating drive means comprise the pistons of double-acting cylinders.

References Cited
UNITED STATES PATENTS

| | | | |
|---|---|---|---|
| 707,112 | 8/1902 | Horrocks | 74—29 X |
| 1,136,137 | 4/1915 | Hunter | 74—29 |
| 2,803,445 | 8/1957 | Borrowdale | 175—106 X |
| 3,040,717 | 6/1962 | Rumsey | 74—109 X |
| 3,231,029 | 1/1966 | Winberg | 175—53 |

NILE C. BYERS, JR., Primary Examiner

U.S. Cl. X.R.

74—109